United States Patent Office 2,782,519
Patented Feb. 26, 1957

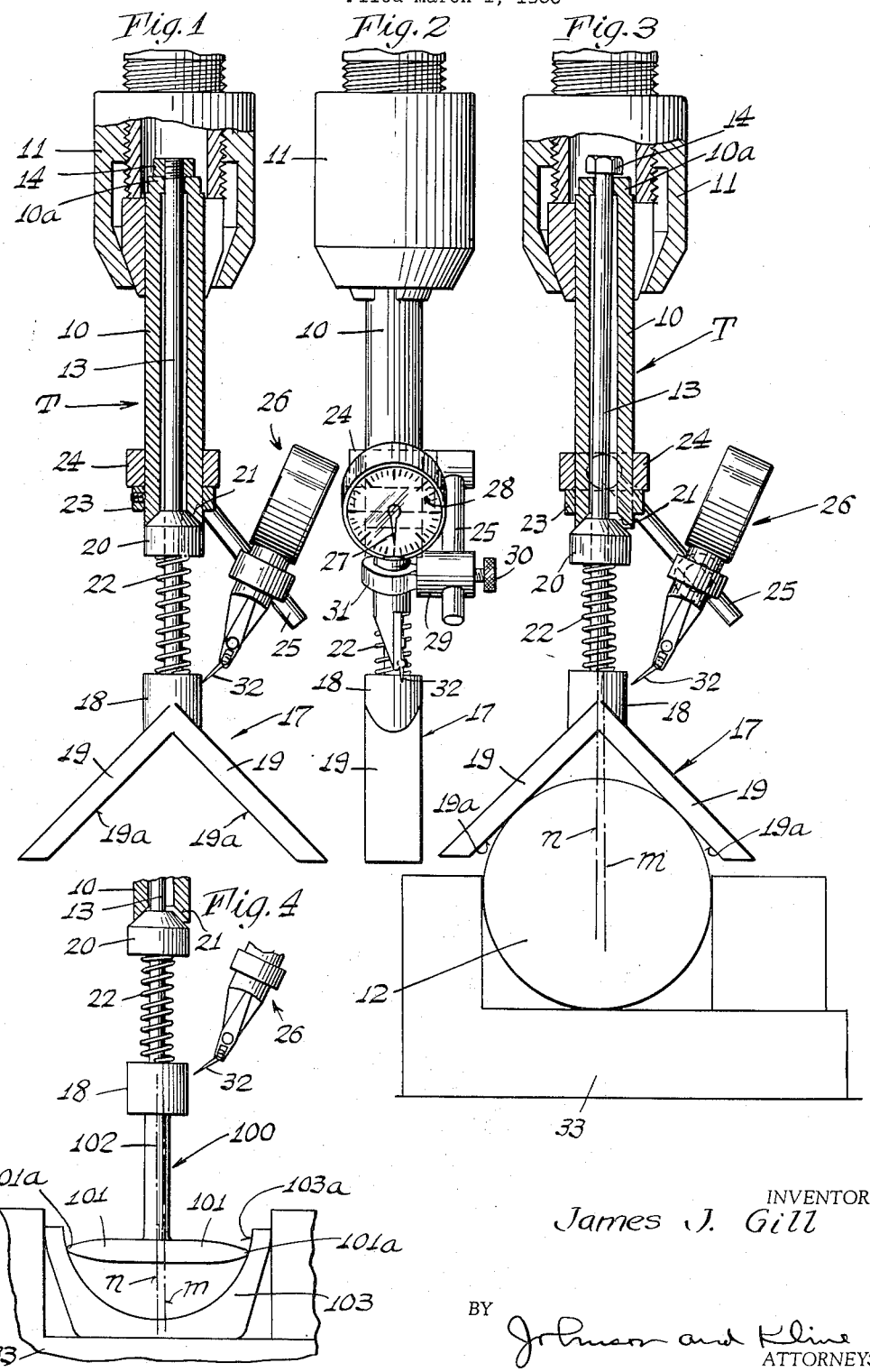

2,782,519

CENTERING TOOL

James J. Gill, Fairfield, Conn.

Application March 1, 1955, Serial No. 491,436

1 Claim. (Cl. 33—185)

This invention relates to a machinist's centering tool and more particularly to a tool for enabling the centerline of a machine tool to be brought into coincidence with a fixed predeterminate plane in a round workpiece.

Heretofore it was difficult and oftentimes impossible to accurately locate the true centerline of a round workpiece whereby it would be in coincidence with a fixed predeterminate plane so that subsequent operations may be performed on the piece with the accuracy desired. This was so because the centering tools heretofore known required the operator to visually align indicator elements such as indicia or scribe marks on the tool in order to determine the position of the centerline of the piece. The disadvantage of visually aligning such elements was that the accuracy in the use of the tool was dependent upon the eyesight of the operator, the angle at which he viewed the aligning scribe marks, the width of the scribe marks, and other human errors which, when accumulated, increased the inaccuracies and rendered such centering tools unreliable for high precision work.

An object of this invention is to provide a centering tool which accurately positions a true centerline of a round workpiece in coincidence with a fixed predeterminate plane so that subsequent operations such as drilling, forming keyways, slots, splines, or the like, can be more accurately performed with reference to the true centerline of the round piece than was heretofore possible.

Another object of this invention is to provide a centering tool which quickly, easily and accurately positions and determines the location of a centerline of a round workpiece.

These and other objects of this invention which will hereinafter appear are accomplished by the provision of a simple and efficient tool which utilizes an ordinary machinist's dial indicator. The tool has a shank which may be mounted in the chuck of a machine, such as a drill press or the like, and work-engaging means mounted on the shank so as to be bodily displaced when brought into engagement with a rounded workpiece whose centerline is not coincident with the centerline of the shank. The work-engaging member has an accurately finished cylindrical portion normally coaxial with the shank but moved out of coaxial relation when the workpiece is off-center.

In the form of the invention herein disclosed as exemplary thereof, means are provided for mounting the dial indicator on the shank of the tool for coaxial rotation and so placed that the feeler of the indicator may engage the cylindrical portion of the work-engaging member. By rotating the dial indicator around the shank, the extent of the off-center relation of the work to the tool may be quickly and easily determined by observing the pointer and dial of the indicator and the work may be tapped or otherwise moved on the bed or other workholder until the pointer on the dial does not move as the indicator is swung around the shank—that is to say, when the movement of the pointer on the indicator is nil.

Thus it will be seen that the tool of the present invention operates on the null principle and thus does not depend upon the machinist reading a pointer against a line but merely on the observation that the pointer does not move at all when testing to determine the vertical centerline on the work.

Other features and advantages will be apparent from the specification and claims when considered with the drawings in which:

Figure 1 illustrates a vertical front view partly in section of a novel centering tool illustrating the tool in its normal "zero" position.

Fig. 2 is a side elevational view.

Fig. 3 is a front elevational view partly in section illustrating the position of the tool when the vertical centerline of a round workpiece is out of alignment with the centerline of a tool.

Fig. 4 is a modified form of the work-engaging means.

In high precision work with round stock, or the like, it is desirable that the centerline of the stock be accurately positioned in coincidence with a predetermined plane in order to perform subsequent operations thereon which are required to be square on the centerline thereof. While the tool of the present invention may be used to locate the horizontal, or any other intermediate centerline coincident with a predetermined plane, for purposes of explanation the novel centering tool is illustrated and described as locating the vertical centerline of a round workpiece or stock and the like.

As shown in Figs. 1 to 3, the tool T comprises a smoothly-finished hollow shank 10 which is capable of being mounted in the chuck 11 of a machine such as a vertical drill press, and the like, which is subsequently to receive the drill or other working tool (not shown) centered over the vertical centerline of the round workpiece 12. The upper portion of the shaft is closed by a top 10a having an opening coaxially aligned with the shaft to receive a rod 13. The rod 13 extending longitudinally of the shank 10 is mounted for longitudinal and lateral movement within the shank, the diameter of the rod being somewhat smaller than that of the internal diameter of the shank. A head 14, shown as a nut threaded to the upper end of the rod 13, prevents the rod from dropping through the hollow shaft. On the other end of the rod which projects downwardly from the lower end of the shank, there is mounted thereon a work-engaging member 17.

While the work-engaging member 17 may take any desirable form, it is herein illustrated as comprising an upper portion which has an accurately-finished, smooth, cylinder portion 18 mounted on the end of the rod and accurately concentric therewith. Depending from the cylinder 18 is a pair of work-engaging arms 19 which have a smoothly finished surface 19a which are adapted to engage opposite surfaces of the workpiece 12 to be centered. See Fig. 3.

Referring to the form of the invention shown in Figs. 1 to 3, for engaging the convex surface of a workpiece the arms may be disposed at any desired angle. As herein illustrated they form a right angle so that the arms 19 engage a round workpiece tangentionally on an arc of 90 degrees with a common plane extending through the center of the workpiece and the vertex of the arms bisecting the angle formed thereby. Thus when the vertex of the angle formed by the arms 19 is in a vertical plane coinciding with the centerline of the shank 10 of the tool, and hence with that of the chuck 11, the centerline of the workpiece is determined.

In order to normally maintain the rod 13 concentrically positioned relative to the shank, a centering member 20 is slidably mounted on the rod 13 to engage the lower end of the shank which has a complementary portion 21 to receive the centering member. The latter and the complementary portion are accurately finished so that when completely engaged, the rod is made concentric with the longitudinal centerline of the shank. While the member 20 and the mating portion 21 of the shank may be spherically or otherwise shaped, they are herein illustrated as being conical.

To normally urge the centering member 20 into concentric relationship with the shank, a spring 22 is disposed on the rod between the cylinder 18 of the work-engaging member 17 and the centering member 20 so that the rod 13 is normally axially aligned with the centerline of the shank which is also the centerline of the drill press or like machine in which the tool is mounted. It will be further noted that the spring 22 enables the work-engaging member 17 and the rod 13 connected thereto to be resiliently mounted vertically so that the tool may be adapted to operate on round stocks of varying diameters.

In order that any disalignment between the centerline $n$ of the rod 13 and the centerline $m$ of the shank 10 can be noted and detected when the centering tool T is brought to bear against a workpiece 12, a dial indicator supporting means is rotatably mounted on a lower portion of the shaft which is accurately finished so that the dial-supporting means may be squared with the cylinder of the work-engaging member when the tool T is in normal "zero" position as shown in Fig. 1. A collar 23 fixed to the shaft 10 supports a rotating ring 24 which has mounted thereon a projecting arm 25 supporting a suitable dial indicator 26 having a pointer 27 and a calibrated dial 28.

While the dial indicator 26 may be mounted on the arm 25 by various means, the dial indicator as herein illustrated is mounted in a bearing 29 slidably supported on the arm 25 so as to be conveniently adjusted thereon, and a thumb screw 30 locks the bearing at any desired position on the arm. If desired, the indicator may be rotatably supported by a yoke 31 which is mounted in said bearing 29. Connected to the mechanism (not shown) of the indicator is a feeler 32 which is positioned closely adjacent the smooth cylinder portion 18 of the work-engaging member 17, the feeler 32 being suitably connected or geared to the pointer 27 so that the slightest displacement of the feeler 32 is greatly exaggerated so that the displacement thereof is readily perceptible on the face of the dial.

In the illustrated embodiment of the present invention whenever it is desirable for an operation, such as for example drilling a hole to be squarely and accurately formed on the vertical centerline of a round workpiece, a machinist positions a workpiece on the bed 33 of the machine and aligns the centerline of the workpiece with the centerline of the chuck thereon as closely as he can visually approximate the same. The centering tool T, herein described, positioned in the chuck 11 of the machine is then brought into engagement with the workpiece. As shown in Fig. 3, and as is most often the case, the workpiece 12 not being truly centered on the bed 33 causes the rod centering member 20 to be unseated from the complementary recess portion 21 of the shank, as the rod is laterally displaced. As a result the cylinder portion 18 of the work-engaging member concentrically mounted on the end of the rod is likewise moved out of concentric alignment with the centerline of the shank.

As shown in Fig. 3, such displacement is greatly exaggerated for purposes of illustration, but in normal high precision work, such similar displacement is very minute and not easily perceptible. However, according to this invention such invisible displacements are readily determined by rotating the dial indicator 26 about the shaft. In any misaligned position the feeler 32 engaging the cylinder portion 18 of the work-engaging means will be forced to travel in a nonconcentric path, thereby causing the amount of any disalignment to be shown by movement of the pointer over the dial face of the indicator, the pointer being connected to the feeler so that the latter's movement is greatly amplified. Since the dial of the indicator is calibrated, the amount of disalignment is easily and quickly determined.

When it is found that the centerline of the workpiece is not properly positioned on the bed of the machine, the piece 12 may be tapped or otherwise moved the required amount as indicated by the dial reading. A spin of the dial indicator around the shaft simply and quickly a second time will determine if the true vertical centerline of the piece is brought in coincidence with the predetermined vertical plane of the machine. If necessary, this procedure is followed until the dial reading, during revolution of the dial about the shank, remains "zero," i. e. when the feeler 32 does not cause the pointer 27 of the dial to be displaced. It should be noted that a properly calibrated dial indicator will reduce the number of trials required to center the workpiece to a minimum since guess work as to how much the workpiece should be moved and in which direction is largely eliminated.

Figure 1 is illustrative of the centering tool in "zero" position, that is, when the vertical centerline of the workpiece, shown in dotted line, lies in the plane passing through the longitudinal center of the shank which is also the center of the chuck. In this position the centering member 20 is completely seated in the recess 21 of the shank, therefore insuring that the centerline of the rod 13 and of the centering member 20 thereon are axially aligned with the centerline of the shank. Thus, when the feeler is revolved about the cylinder portion, it will travel a path which is concentric with the shank, the centerline of which lies in the desired fixed plane and therefore does not cause the pointer on the dial to be displaced. Consequently, since there is no out-of-alignment registry indication on the face of the dial, the indication is that the centerline of the workpiece is truly coincident with the centerline of the shank and of the machine. Any subsequent operation may now be accurately performed with reference to the true centerline of the workpiece by removing the centering tool from the chuck and inserting therein the required working tool such as a drill bit (not shown) to carry out the subsequent desired operation on the workpiece which is now accurately centered and secured to the bed of the machine.

For use in centering workpieces having a concave surface, a modified form of a work-engaging member 100 is illustrated in Fig. 4. In this form the work-engaging member has opposed arm member 101 forming a straight angle disposed at right angle to the rod 102. The end portions 101a of the arms 101 are machined with rounded ends. In operation the rounded end portions 101a engage the opposite inner surfaces 103a of a concave workpiece 103 rather than the outer surface thereof. In all other aspects the operation of the tool remains the same as described relative to Figs. 1 to 3.

From the foregoing description it will be noted that the centering tool T herein described is relatively simple in construction as in operation. Precision heretofore unobtainable can now be had quickly, simply and with much less effort on the part of the operator.

Variations and modifications may be made within the scope of the claims and portions of the improvements may be used without others.

I claim:

A tool for accurately locating a plane passing through the centerline of a cylindrical workpiece comprising a hollow tubular member adapted to be gripped by a chuck of a drill press or the like; a rod passing longitudinally through said tubular member and providing an accurate bearing fit at the upper end thereof; a conical seat at the lower end of said tubular member; a centering member rotatable and longitudinally slidable on said rod and provided with a conical surface adapted to mate with that on the lower end of said tubular member; a cylindrical member integral with the lower end of said rod and having an exterior surface concentric with the centerline of said rod; a spring between said cylindrical member and said centering member urging the latter into engagement with the conical seat on the lower end of said tubular member; a mounting on said tubular member for supporting an indicator in position to cooperate with said cylindrical member; and a pair of angularly-disposed legs rigidly attached to the lower end of said cylindrical member and having the apex thereof in exact coincidence at all times with the centerline of said rod.

References Cited in the file of this patent
UNITED STATES PATENTS

| | | |
|---|---|---|
| 1,395,087 | Brion | Oct. 25, 1921 |
| 2,533,198 | Radtke | Dec. 5, 1950 |
| 2,674,045 | Lakomski | Apr. 6, 1954 |